No. 633,376. Patented Sept. 19, 1899.
L. DAVIES.
MEANS FOR SECURING PROPELLER BLADES.
(Application filed May 22, 1899.)
(No Model.)
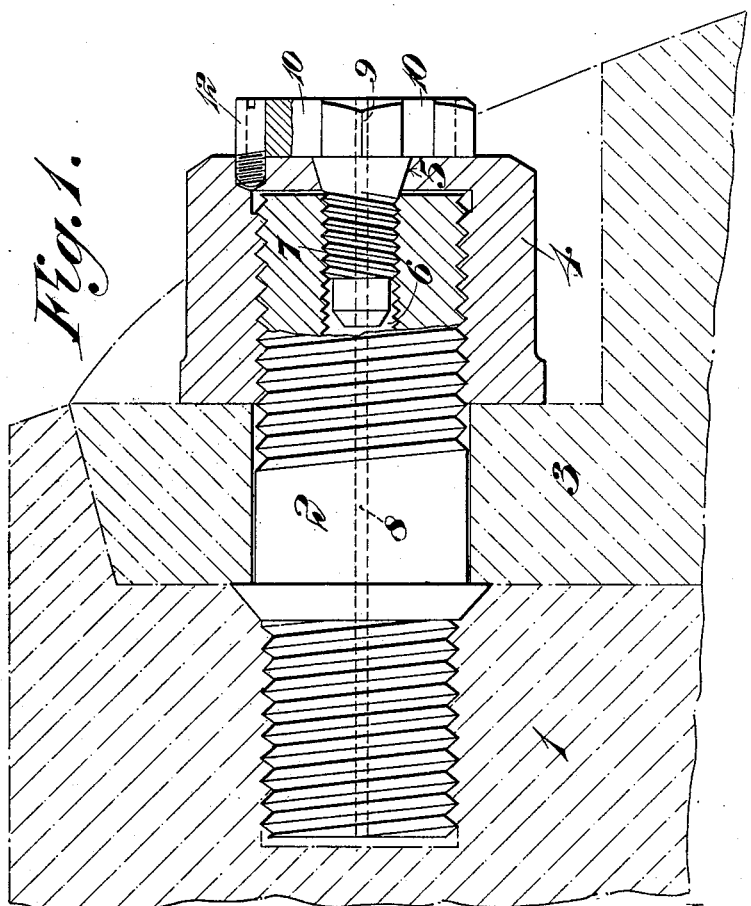
Witnesses.
Geo E Pych
B. E. Seitz
Inventor
Lewis Davies
by A S Pattison, Atty

UNITED STATES PATENT OFFICE.

LEWIS DAVIES, OF LIVERPOOL, ENGLAND.

MEANS FOR SECURING PROPELLER-BLADES.

SPECIFICATION forming part of Letters Patent No. 633,376, dated September 19, 1899.

Application filed May 22, 1899. Serial No. 717,793. (No model.)

*To all whom it may concern:*

Be it known that I, LEWIS DAVIES, a subject of the Queen of Great Britain and Ireland, residing at Liverpool, in the county of Lancaster, England, have invented Improved Means for Securing Propeller-Blades to their Bosses, of which the following is a specification.

This invention relates to the means used for securing propeller-blades to their bosses, and has been devised in order that such blades may be held more securely in position than when fixed in the ordinary way.

Hitherto it has been usual to screw a cap-nut over the end of each of the studs or bolts used in securing the blades of the propeller to its boss; but these cap-nuts have been liable to work loose, and as a result the blades have sometimes been either lost or broken. Now according to my invention I employ studs or bolts and cap-nuts constructed as shown in the accompanying drawings, of which—

Figure 1 is a central longitudinal section, partly in elevation, through one of the studs or bolts that secure the blade to the boss; and Fig. 2 is an end view.

1 is the propeller-boss into which the stud or bolt 2 is screwed, and 3 is one of the blades through the flange of which the stud or bolt 2 extends.

4 is a cap-nut screwed upon the end of the bolt 2 and formed with an aperture 5, preferably of tapering form, as shown. In the end of the stud or bolt 2 there is also formed a correspondingly-arranged hole 6, which is screw-threaded and into which is screwed a set-screw 7, whose threads are formed in the reverse direction to those of the cap-nut 4—that is, if the one has right-hand screw-threads the other has left-hand screw-threads. The set-screw 7 is formed with a tapering shoulder part to fit the aperture 5. The bolt 2 is formed with a small passage 8, extending from the hole 6 to its inner end, and the set-screw 7 is also formed with a small passage 9 from end to end, so that water can escape from the holes which receive the stud or bolt 2 and the set-screw 7 as they are screwed into them. As will be understood, backward movement of the cap-nut 4 will be prevented by the head of the set-screw 7, which, owing to the friction between it and the cap-nut, will tend to turn with and in the same direction as the cap-nut. The set-screw 7 thus tends to become screwed farther in as the cap-nut tends to become unscrewed. The set-screw 7 may be formed with recesses 10 and the cap-nut with a series of holes 11. By bringing one or other of the recesses 10 over one of the holes 11 and then screwing into the latter a pin or screw 12 accidental unscrewing of the set-screw 7 will be prevented. The arrangement of the holes 10 and 11 is such that in no case is more than a slight turning movement of the set-screw necessary to bring one or more of the holes 10 in line with one or more of the holes 11. Thus whenever the set-screw 7 is screwed home, or practically so, it can be secured by the pin or screw 12.

What I claim is—

1. Means for securing the blades of a propeller to the boss comprising studs or bolts screwed into the boss and each formed with a screw-threaded hole, a reversely-screw-threaded cap-nut formed with a central aperture and a series of holes arranged at equal distances from the axis of the nut, but at unequal distances from each other and a set-screw that extends through said aperture into the hole in the stud or bolt and has a series of recesses around its head, and a pin or screw adapted to be inserted in either of the series of holes in the cap-nut as and for the purpose specified.

2. Means for securing the blades of a propeller to the boss, comprising studs or bolts screwed into the boss and each formed with a longitudinal passage and a screw-threaded hole, a reversely-screw-threaded cap-nut formed with a central aperture, and a set-screw that extends through said aperture into the hole in the stud or bolt and is also formed with a longitudinal passage through it, as set forth.

3. Means for securing the blades of a propeller to the boss comprising studs or bolts screwed into the boss and each formed with a longitudinal passage a series of laterally-arranged holes and a screw-threaded hole, a reversely-screw-threaded cap-nut formed with a central aperture, and a set-screw that extends through said aperture into the hole in the stud or bolt and is also formed with a longitudinal passage through it and with a series of recesses around its head, and a pin or screw adapted to be inserted in either of the series of holes in the cap-nut for the purpose specified, as set forth.

4. Means for securing the blades of a propeller to the boss, comprising studs or bolts 2 screwed into the boss and each formed with a passage 8, a series of holes 11, and a screw-threaded hole 6, a reversely-screw-threaded cap-nut 4 formed with an aperture 5, a set-screw 7 formed with a passage 9 and a series of recesses 10, and a pin or screw 12, as set forth.

Signed at 5 Fenwick street, in the city of Liverpool, in the county of Lancaster, England, this 9th day of May, 1899.

LEWIS DAVIES.

Witnesses:
T. H. THORNELY,
S. B. BAILEY.